United States Patent
Hwa et al.

[11] 3,764,638
[45] Oct. 9, 1973

[54] PROCESSING AIDS FOR POLYVINYL CHLORIDE AND METHODS FOR THEIR PREPARATION

[75] Inventors: Jesse C. H. Hwa, Stamford, Conn.; Ruth E. Gallagher, Dobbs Ferry, N.Y.

[73] Assignee: Stauffer Chemical Company, New York, N.Y.

[22] Filed: July 9, 1970

[21] Appl. No.: 53,687

Related U.S. Application Data

[62] Division of Ser. No. 715,936, March 25, 1968, abandoned.

[52] U.S. Cl. 260/876 R, 260/29.6 RB, 260/45.75 K, 260/836, 260/884
[51] Int. Cl. ........................ C08f 37/18, C08f 15/26
[58] Field of Search .................. 260/876 R

[56] References Cited
UNITED STATES PATENTS

| | | | |
|---|---|---|---|
| 3,504,053 | 3/1970 | Williams | 260/884 |
| 2,746,944 | 5/1956 | Naps et al. | 260/884 |

FOREIGN PATENTS OR APPLICATIONS

| | | | |
|---|---|---|---|
| 932,852 | 7/1963 | Great Britain | 260/876 |

*Primary Examiner*—Murray Tillman
*Assistant Examiner*—John Seibert
*Attorney*—Wayne C. Jaeschke, Martin Goldwasser and John L. Callahan

[57] ABSTRACT

Relatively small proportions of acrylic monomer are added to a polyvinyl chloride emulsion and polymerization initiated with a water-soluble free radical catalyst. The product is useful especially as a processing aid for polyvinyl chloride.

12 Claims, 3 Drawing Figures

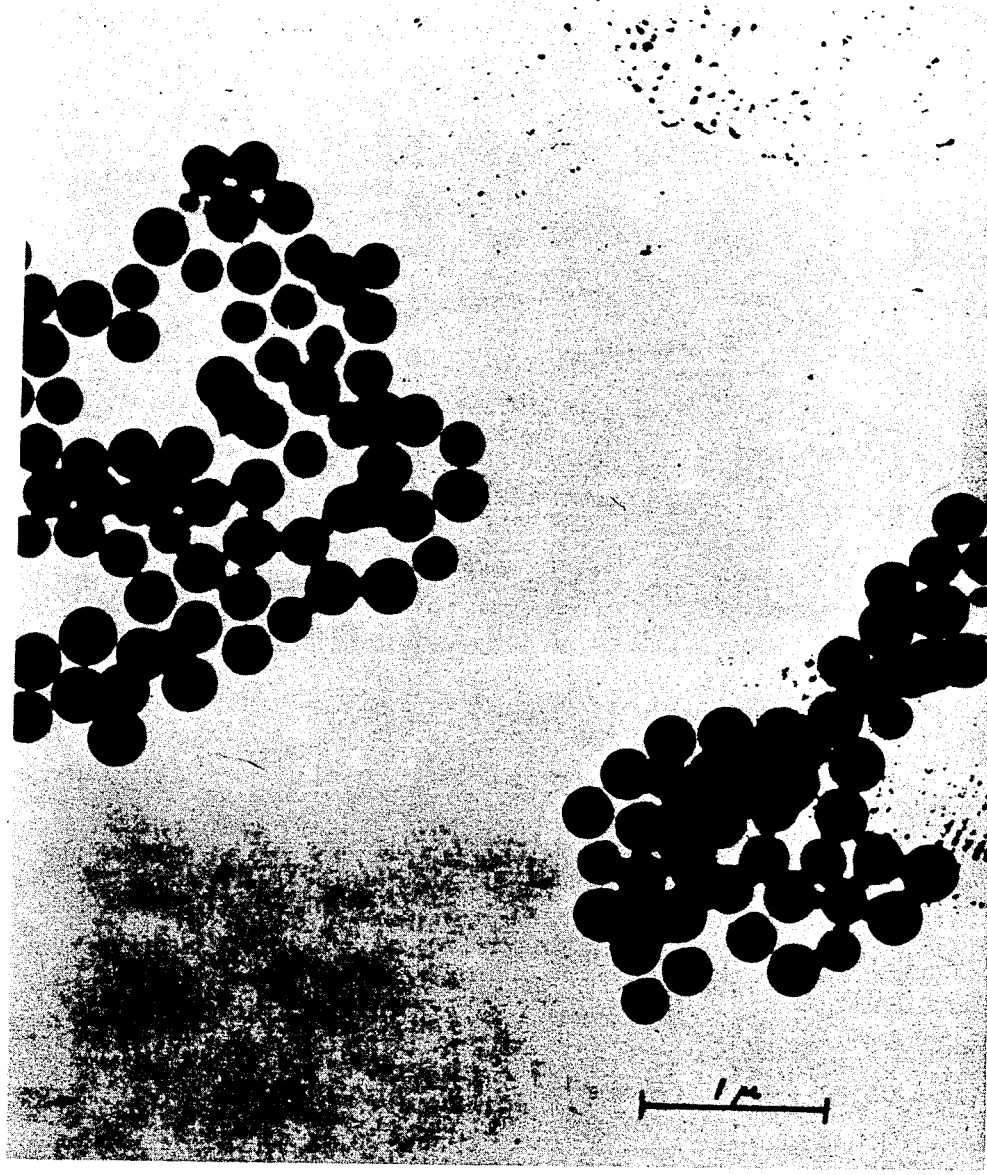
FIG.I.

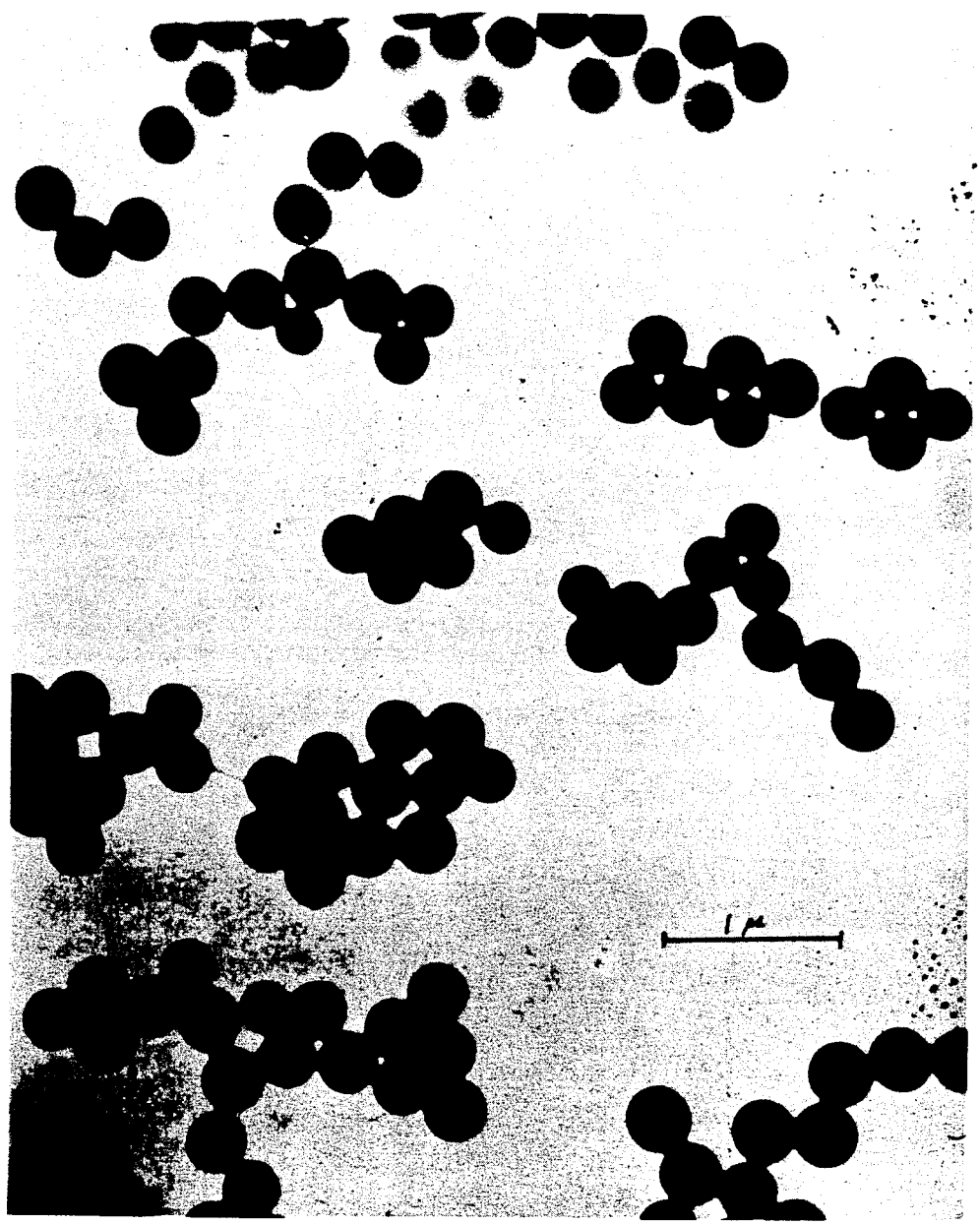
FIG. II.

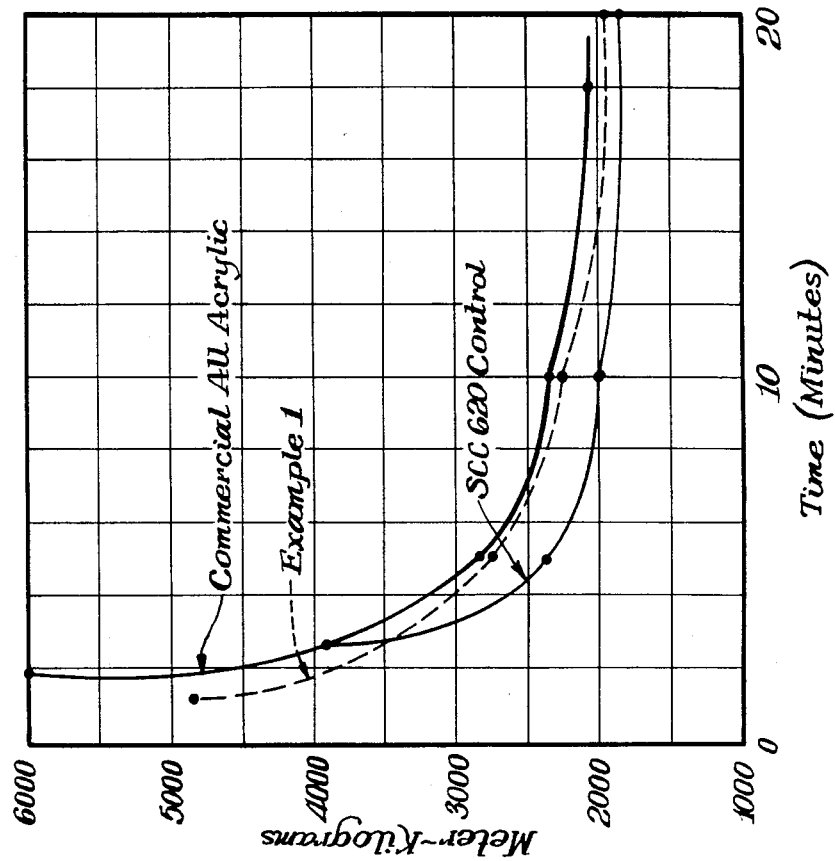
FIG. III.

3,764,638

PROCESSING AIDS FOR POLYVINYL CHLORIDE AND METHODS FOR THEIR PREPARATION

RELATED APPLICATION

This application is a divisional application of application Ser. No. 715,936, filed Mar. 25, 1968, now abandoned.

BACKGROUND OF THE INVENTION

When manufacturing polyvinyl chloride the resin undergoes a fluxing step after which it is processed to its desired shape. During this time the resin must remain stable at the processing and fluxing temperatures. Additionally the resin must yield under stress, must have adequate flow properties and must lend itself to milling and extrusion. Since the polyvinyl chloride alone sometimes does not possess these properties, it has been necessary or desirable to add various processing aids to the resin. For instance, pure acrylic polymers in granular form are dry-mixed with the PVC resin and then milled on a calender or extruded. Such aids permit faster calendering with improved gloss, better surface qualities on extrusion, freedom from plating, improved flow and other benefits.

SUMMARY OF THE INVENTION

An object of this invention is to provide a method of making a new and more efficient type of processing aid for polyvinyl chloride. A further object is to provide a simple method whereby small proportions of acrylate polymers can be introduced in a final PVC blend. A particular object is to make more efficient use of the acrylic polymer aid by "diluting" it preliminarily with PVC so that the acrylate is thereafter more effectively used during the critical processing step in the melt stage.

In accordance with the broader aspects of this invention, these and other objects are achieved by polymerizing an acrylic monomer in the presence of a polyvinyl chloride emulsion. Apparently the acrylate polymerizes around the polyvinyl chloride particles and thereby produces a product which acts as an effective processing aid for polyvinyl chloride resin. The "diluting" effect is not due to a mere physical blend of PVC particles and acrylic polymer particles. By the special method of preparation, the acrylic monomer is polymerized in or on preformed PVC particles. In this way the acrylic polymer is distributed more evenly. This acrylic-PVC "interpolymer" is then blended with extra PVC and used as a processing aid. PVC is preferred as the carrier for the acrylate because its does not interfere with the performance of the PVC plastic which is to be processed later. However, other relatively inert cores can be substituted, such as polystyrenes.

THE DRAWINGS

FIGS. I and II constitute electron photomicrographs illustrating typical processing aids of this invention at 35,000 × magnification.

FIG. III illustrates certain Brabender plastograph curves.

DETAILED DESCRIPTION OF INVENTION

In an advantageous form of this invention, the acrylic polymer comprises from about 10 percent to about 50 percent by weight and preferably from about 20 to 40 percent by weight of the resultant particle, while the polyvinyl chloride core comprises from about 50 to 90 percent by weight and preferably from about 60 percent to about 80 percent by weight. It is important that the acrylic monomer employed consist primarily (desirably 80 to 100 percent by weight) of alkyl-substituted methacrylates wherein the alkyl group contains from one to three carbons, i.e. methyl, ethyl, n-propyl, 2-propyl and/or glycidyl methacrylates. As a minor ingredient with one or more of these methacrylates in admixture there may be utilized up to about 20 percent by weight of an alkyl-substituted acrylate. The alkyl groups in these acrylates may be long or short, e.g., about C1 to C12 or even higher, and straight or branched, without adverse effect on the process and products of this invention. Within these unique limitations of proportions and carbon chain lengths of the methacrylic and acrylic monomers, one may use essentially any of the acrylates and alkyl-substituted acrylates well-known in the art as processing aids. Especially preferred are methyl and/or ethyl methacrylates, mixtures of 80–100 percent by weight methyl methacrylate and 20–0 percent ethyl acrylate, glycidyl methacrylate and mixtures thereof with any of these.

It has been found that by adding the novel processing aids thus obtained to polyvinyl chloride resins on a 1 to 10 percent by weight level, the resultant mixtures are easier to process than the polyvinyl chloride alone. For example, when studied in a Brabender plastograph, the resulting easier processing resins are characterized by shortened flux times and higher shear torques. The acrylic-modified polyvinyl chloride materials which contain as much as 70 percent polyvinyl chloride offer a real advantage over products which are entirely acrylic.

The process of this invention consits of adding the appropriate amount of acrylic monomer to an aqueous suspension of emulsion-grade polyvinyl chloride, particularly a PVC latex, and initiating polymerization of the acrylate by adding a water-soluble free radical catalyst. Preferred proportions of acrylate to PVC range from about 20:80 to 40:60 by weight. The particular catalyst, temperature, reaction time and other operating conditions chosen are of course inter-dependent and may be those usually employed in the polymerization of acrylates and alkyl-acrylates. Representative free radical catalysts are for instance alkali metal persulphates, ammonium persulphate or a redox catalyst. Temperatures and reaction times range generally from about 20° to 80°C for about ½ to 9 hours. depending or the catalyst chosen. Where desired to lower the molecular weight of the acrylic polymer, a chain transfer agent may be used. Many other variations in polymerization technique will suggest themselves to those skilled in the art.

A polyacrylate skin forms over the polyvinyl chloride core during the reaction. This coated particle may then be recovered from the reaction system by coagulation or by spray-drying the latex. The new method is particularly useful to obtain processing aids for PVC homopolymers and for copolymers of polyvinyl chloride and vinyl acetate, since these materials are notably hard to calender.

It is essential that in this process the surface tension be regulated so that coating of the PVC carrier particles occurs and not the formation of separate acrylic polymer particles. The surface tension is regulated by controlling the amount and kind of emulsifier or soap.

For instance, an apparent surface tension of at least about 40 dynes per square centimeter is necessary, while of course the tension should not be greater than the point at which the polymeric solids in the particular polymerization system begin to flocculate out. Since polyvinyl chloride latex usually has a tension of about 65 dynes/cm$^2$ which is above the flocculation point of the preferred systems of this invention, before the acrylic monomer is introduced, sodium lauryl sulfate or some other known soap may be added to bring the surface tension down within the critical range. A preferred surface tension range in most commercial operations is about 45 to 60 dynes/cm$^2$. The acrylic polymerization may be carried out in the same vessel immediately after the vinyl chloride polymerization is finished or the PVC latex may have been preformed, stored and used at a later date in carrying out this new process. If the acrylic polymerization is carried out in situ at the time the PVC latex is prepared, then it may not be necessary to add additional catalyst.

The following examples are given to illustrate this invention but not in any way to limit its scope. In the chart below can be seen at a glance the relative proportions of polyvinyl chloride carrier and acrylic monomers of various types which were employed in these examples. The PVC in each instance was a conventional latex prepared by emulsion polymerization.

| Example | Weight % PVC | Weight % Acrylic | Acrylic Polymer Composition |
|---|---|---|---|
| 1 | 70 | 30 | 90% methyl methacrylate 10% ethyl acrylate |
| 2 | 85 | 15 | 90% methyl methacrylate 10% ethyl acrylate |
| 3 | 50 | 50 | 87% methyl methacrylate 13% ethyl acrylate |
| 4 | 50 | 50 | 80% methyl methacrylate 20% glycidyl methacrylate |
| 5 | 50 | 50 | 80% methyl methacrylate 10% glycidyl methacrylate 10% ethyl acrylate |
| 6 | 50 | 50 | 90% methyl methacrylate 10% ethyl acrylate |
| 7 | 70 | 30 | 90% methyl methacrylate 10% methyl methacrylate |
| 8 | 90 | 10 | 100% methyl methacrylate |
| 9 | 60 | 40 | 80% methyl methacrylate 20% n-butyl methacrylate |
| 10 | 50 | 50 | 90% methylmethacrylate 10% isopropyl acrylate |
| 11 | 75 | 25 | 100% methyl methacrylate |

EXAMPLE 1

Into a 3-liter, 3-necked, round-bottomed flask are placed 870 grams of a polyvinyl chloride latex and 390 grams of water. The PVC latex has a solids content of 35.2 percent and an apparent surface tension of 50 dynes/cm$^2$. The system is stirred and flushed with nitrogen and 118 grams of methyl methacrylate, 13.1 grams of ethyl acrylate and 0.11 gram of tert.-dodecyl mercaptan were added. After the monomers are stirred with the PVC for thirty minutes, 0.9 gm of K$_2$S$_2$O$_8$ dissolved in 45 gms of water is added, followed by a solution of 0.3 gm of Na$_2$S$_2$O$_4$ in 15 gms of water. There is an exothermic reaction which raises the temperature from 42° to 50°C indicating polymerization has taken place. The product is spray-dried and a free-flowing white powder is obtained.

FIGS. I and II are electron micrographs of both the PVC starting seed (FIG. I) and the acrylic polymer on the PVC carrier after reaction (FIG. II). As can be seen, there is a slight enlargement of the particles (from 0.21–0.29 micron to 0.29 to 0.34 micron), indicating that the acrylic polymerization has taken place around the PVC particles and that no new particle growth has been generated.

EXAMPLE 2

Into a 2-liter, 3-necked, round-bottomed flask are placed 450 gms of water and 745 gms of PVC latex. The PVC latex has a solids content of 45.7 percent and an apparent surface tension of 47 dynes/cm$^2$. The system is stirred and flushed with nitrogen and 54 gms of methyl methacrylate, 6 gms of ethyl acrylate and 0.06 gm of tert.-dodecyl mercaptan are added. After the monomers have been stirred with the PVC for 1 hour, a solution of 0.5 gm K$_2$S$_2$O$_8$ in 50 gms of water is added followed by a solution of 0.18 gm of Na$_2$S$_2$O$_4$ in 25 gms of water. The reaction is heated at 55°C for 30 minutes to polymerize the monomers. The latex is spray-dried and a free flowing white powder is obtained.

EXAMPLE 3

Into a 3-liter, 3-necked, round-bottomed flask are placed 440 gms of a PVC latex and 570 gms of water. The PVC latex has a solids content of 45.6 percent and an apparent surface tension of 47 dynes/cm$^2$. The system is stirred and flushed with nitrogen and 174 gms of methyl methylacrylate and 26 gms of ethyl acrylate are added. After the monomers are stirred with the PVC for one hour, a solution of 1 gm of K$_2$S$_2$O$_8$ in 80 gms of water is added, followed by a solution of 0.33 gm of Na$_2$S$_2$O$_4$ in 40 gms of water. There is an exothermic reaction of 17°C indicating polymerization. After cooling the latex has a solids content of 29.9 percent by weight and an apparent surface tension of 51.2 dynes/cm$^2$. The latex is spray-dried and a free flowing white powder is obtained.

EXAMPLE 4

Into a 2-liter, 3-necked, round-bottomed flask are placed 300 gms of water and 200 gms of PVC latex. The PVC latex has a solids content of 49 percent and an apparent surface tension of 48.8 dynes/cm$^2$. The system is stirred and flushed with nitrogen and 78.6 gms of methyl methacrylate and 19.6 gms of glycidyl methacrylate are added. After the monomers have been stirred with the PVC for 30 minutes, a solution of 0.5 gm of K$_2$S$_2$O$_8$ in 85 gms of water is added, followed by a solution of 0.16 gm of Na$_2$S$_2$O$_4$ in 15 gms of water. There is soon a temperature increase of 10°C from 30°–40°C indicating polymerization. The resulting latex solids content is found to be 27.7 percent indicating 99.5 percent conversion of monomer into polymer. To isolate the polymer the latex is subjected (after dilution with 2 parts of water) to alternate freezing and heating (70°–95°C) and after two cycles the solid polymer is filtered off, washed and air dried.

EXAMPLE 5

Into a 2-liter, 3-necked, round-bottomed flask are placed 300 gms of water and 200 gms of the PVC latex of Example 4. The system is stirred and flushed with nitrogen and 9.84 gms of ethyl acrylate, 9.84 gms of glycidyl methacrylate and 78.7 gms of methyl methacrylate are added. After the monomers have been stirred with the PVC for 1 hour, a solution of 0.5 gm of K$_2$S$_2$O$_8$ in 85 gms of water is added, followed by a solution of 0.16 gm of Na$_2$S$_2$O$_4$ in 15 gms of water. There is soon an exothermic reaction raising the temperature from 30° to 40°C, indicating polymerization. The latex is then heated an additional hour at 45° to 53°C to complete the polymerization. The polymer is isolated by treating the latex by the procedure described in Example 4.

EXAMPLE 6

Into a 2-liter, 3-necked, round-bottomed flask are placed 311 gms of water and 200 gms of a PVC latex. The PVC latex has a solids content of 49.2 percent and an apparent surface tension of 47 dynes/cm². The system is stirred and flushed with nitrogen and 88.6 gms of methyl methacrylate, 9.8 gms of ethyl acrylate and 0.1 gm of tert.-dodecyl mercaptan are added. After the monomers have been stirred with the PVC for 1 hour, a solution of .5 gm of $K_2S_2O_8$ in 75 gms of water is added, followed by a solution of 0.16 gm of $Na_2S_2O_4$ in 25 gms of water. There is a 10°C exothermic reaction indicating polymerization has taken place, after which the reaction is heated at 40°–50°C for 1 hour. The solids are found to be 27.4 percent by weight, indicating the conversion was 98.5 percent. The apparent surface tension of this latex is 52 dynes/cm². To isolate the polymer the latex is diluted with 2 parts of water and subjected to alternate freezing and heating cycles (70°–85°C) and after two cycles the solid polymer is filtered off, washed and air dried.

EXAMPLE 7

The procedure of Example 1 is followed, this time using 118 gms of ethyl methacrylate and 13.1 gms of methyl methacrylate. The PVC latex in this instance has a solids content of about 35 percent and an apparent surface tension of 44 dynes/cm². A free flowing white powder of essentially the same characteristics as the product of Example 1 is obtained.

EXAMPLE 8

Into a 1-liter, 3-necked, round-bottomed flask are placed 350 gms of a PVC latex having a solids content of 16 percent and an apparent surface tension of 60 dynes/cm². The system is stirred and flushed with nitrogen and 5.57 gms of methyl methacrylate are added. After the monomer is stirred with the latex for twenty minutes, a solution of 0.005 gm of $Na_2S_2O_8$ in 0.5 gm of water is added. The reaction is heated at 45°C for 3 hours to polymerize the methyl methacrylate. The latex is then air dried to obtain a free flowing white powder.

EXAMPLE 9 Mixed Resin

Again following the procedure of Example 1 a processing aid is obtained consisting of 60 percent by weight of polyvinyl chloride coated with 40 percent by weight of a mixture of 80 percent polymethyl methacrylate and 20 percent poly(n-butyl)methacrylate.

EXAMPLE 10

The procedure of Example 6 is employed, this time using 88.6 gms of methylmethacrylate and 9.8 gms of isopropyl acrylate. The latex produced is treated by alternate freezing and heating as in Example 6 and the expected useful processing aid is obtained.

EXAMPLE 11

Still another novel product particularly useful as a processing aid in the calendering of PVC is obtained following the procedure of Example 1. The reactants differ from those of Example 1 in that the sole acrylic monomer employed is methyl methacrylate and the portions of monomer to PVC carrier are respectively 25:75 by weight.

The following examples illustrate the use of the new acrylic-on-PVC polymers as processing aids for PVC.

EXAMPLE 12

A rigid PVC formulation is set up to check the efficiency of the new aids in comparison with a commercial all-acrylic product at equal acrylic levels. ("Phr" indicates parts by weight per hundred.)

100 phr PVC suspension resin (Stauffer SCC 620)
x Processing aid
3 phr Thermolite 31 (a tin stabilizer)
0.5 phr Calcium stearate (lubricant)
Mill temperatures 360°F roll speed ratio 1:1.4
Total milling time — 5 minutes past band.

| Sample | Time to Band (min.) | Roll tack | Surface | Clarity | Bank |
|---|---|---|---|---|---|
| SCC 620 (control) | 5 ½ | poor | rough | poor | poor |
| SCC 620 + 10 phr Spray dried PVC latex | 5 ½ | poor | rough | poor | poor |
| SCC 620 + 10 phr processing aid* (Ex. 1) | 2 ½ | excel-smooth | very | good | smooth rolling |
| SCC 620 + 3 phr commercial all acrylic processing aid | 4 | fair | smooth | fair | rough rolling |
| SCC 620 + 5phr commercial all acrylic processing aid | 3 | good | smooth | good | smooth rolling |

* 7 phr PVC, 3 phr acrylic

Based on the examination of the behavior on the mill and the finished sheets, the product from example 1 is more active than an equal portion (3 parts) of an all-acrylic commercial material and equal in effectiveness to 5 parts of the all-acrylic material. This extra or improved activity on the mill is believed due to the greater and more uniform dispersion of the acrylic in the vinyl. Another added advantage in using PVC as the carrier with an acrylic coating is that there is less separation during transport of the dry resin processing aid mixes. This separation which occurs in commercial formulations is due to differences in the specific gravity of the vinyl and the acrylic portions of the mix, thus creating dispersion problems.

EXAMPLE 13

The Brabender Plastograph is commonly used in studying the melt behavior and comparative processability of different polymer samples. The following table lists the data taken from the Brabender curves, which are attached as FIG. III. All additives are used at 10 phr level in the PVC resin (SCC 620). A short flux time and high torque values are considered to be characteristic of an easier processing resin.

| Sample No. | Flux Time Min. | Peak Torque Value M/KgM | Torque Value 5 min. | 10 min. | 15 min. |
|---|---|---|---|---|---|
| SCC 620 control | 2.5 | 3900 | 2400 | 2075 | 1950 |
| Commercial acrylic product | 1.9 | 6000 | 2750 | 2350 | 2125 |
| Example 1 (70 PVC; 30 acrylic) | 1.1 | 7800 | 2750 | 2350 | 2100 |

What is claimed is:

1. A method of enhancing the processing characteristics of polyvinyl chloride which comprises the intimate admixture therewith of a plurality of coated polyvinyl chloride resin particles, said particles comprising a core of emulsion grade polyvinyl chloride resin having a coating thereon of a polymer derived from about 80–100 percent by weight of at least one methacrylate monomer selected from the group consisting of glycidyl methacrylate and the $C_1$–$C_3$ alkyl methacrylates and mixtures thereof and from about 0–20 percent by weight of at least one acrylate monomer selected from the group consisting of the $C_1$–$C_{12}$ alkyl acrylates and mixtures thereof, said coated particles being prepared by admixing said methacrylate monomer or monomers with a previously polymerized aqueous latex containing preformed polyvinyl chloride and polymerizing said monomer or monomers in the presence of a water soluble free radical catalyst while said monomer or monomers are admixed with said previously prepared aqueous latex of preformed polyvinyl chloride while maintaining the surface tension of the system at between about 40 dynes per square centimeter and about 60 dynes per square centimeter, the polymerization taking place, and, the polymer comprising the coating for said particles being present in and/or around the polyvinyl chloride core of said particles in a concentration of from about 10–50 percent of the total weight of said coated polyvinyl chloride particles.

2. The method of claim 1, wherein the polymer comprising the coating for said coated particles is present in a concentration of from about 20–40 percent of the total weight of said coated particles.

3. The method of claim 1, wherein the polymer comprising the coating for said coated particles is a polymer derived from about 80–100 percent, by weight, of at least one methacrylate monomer selected from the group consisting of methyl methacrylate, ethyl methacrylate and mixtures thereof and from about 0–20 percent, by weight, of at least one $C_1$–$C_{12}$ alkyl acrylate monomer and mixtures thereof.

4. The method of claim 3, wherein the polymer comprising the coating for said particles is a polymer derived from about 90 percent, by weight, of methyl methacrylate and from about 10 percent, by weight, of ethyl acrylate.

5. The method of claim 3, wherein the polymer comprising the coating for said particles is polymethyl methacrylate.

6. The method of claim 1, wherein said coated particles are admixed with said polyvinyl chloride in a concentration of from about 1–10 percent as based on the weight of said polyvinyl chloride.

7. A polyvinyl chloride resin composition displaying enhanced processing characteristics, said composition comprising an intimate admixture of emulsion grade polyvinyl chloride with a plurality of coated polyvinyl chloride resin particles having a coating thereon of a polymer derived from about 80–100 percent by weight of at least one methacrylate monomer selected from the group consisting of glycidyl methacrylate and the $C_1$–$C_3$ alkyl methacrylates and mixtures thereof and from about 0–20 percent by weight of at least one acrylate monomer selected from the group consisting of the $C_1$–$C_{12}$ alkyl acrylates and mixtures thereof, said coated particles being prepared by admixing said methacrylate monomer or monomers with a previously polymerized aqueous latex containing preformed polyvinyl chloride and polymerizing said monomer or monomers in the presence of a water soluble free radical catalyst while said monomer or monomers are admixed with said previously prepared aqueous latex of preformed polyvinyl chloride while maintaining the surface tension of the system at between about 40 dynes per square centimeter and about 60 dynes per square centimeter, the polymerization taking place, and, the polymer comprising the coating for said particles being present in and/or around the polyvinyl chloride core of said particles in a concentration of from about 10–50 percent of the total weight of said coated polyvinyl chloride particles.

8. The polyvinyl chloride resin composition of claim 7, wherein the polymer comprising the coating for said particles is present in a concentration of from about 20–40 percent of the total weight of said coated particles.

9. The polyvinyl chloride resin composition of claim 1, wherein the polymer comprising the coating for said particles is a polymer derived from about 80–100 percent, by weight, of at least one methacrylate monomer selected from the group consisting of methyl methacrylate, ethyl methacrylate and mixtures thereof and from about 0–20 percent, by weight, of at least one $C_1$–$C_{12}$ alkyl acrylate monomer and mixtures thereof.

10. The polyvinyl chloride resin composition of claim 9, wherein the polymer comprising the coating for said particles is a polymer derived from about 90 percent, by weight, of methyl methacrylate and from about 10 percent, by weight, of ethyl acrylate.

11. The polyvinyl chloride resin composition of claim 9, wherein the polymer comprising the coating for said particles is polymethyl methacrylate.

12. The polyvinyl chloride resin composition of claim 7, wherein said coated particles are present in a concentration of from about 1–10 percent as based on the weight of said polyvinyl chloride.

* * * * *

PO-1050
(5/69)

UNITED STATES PATENT OFFICE
CERTIFICATE OF CORRECTION

Patent No. 3,764,638　　　　　　　　　　Dated October 9, 1973

Inventor(s) Jesse C. H. Hwa, Ruth E. Gallagher

It is certified that error appears in the above-identified patent and that said Letters Patent are hereby corrected as shown below:

Column 1, lines 16-17, "somtimes" should be -- sometimes --.
Column 3, line 40, Example 7, the 90% "methyl methacrylate" should be -- ethyl methacrylate. --.
Column 6, line 25, in the table, item three in column 2 "excel-smooth" should be -- excel-lent; item 3 in the third column "very" should be -- very smooth --.
Column 8, line 39, claim 9, "$c_{12}$" should be -- $C_{12}$ --.

Signed and sealed this 18th day of June 1974.

(SEAL)
Attest:

EDWARD M. FLETCHER, JR.　　　　　　　C. MARSHALL DANN
Attesting Officer　　　　　　　　　　　Commissioner of Patents